June 29, 1937.  V. W. KLIESRATH  2,085,591
MOTOR VEHICLE
Filed July 8, 1933  2 Sheets-Sheet 1
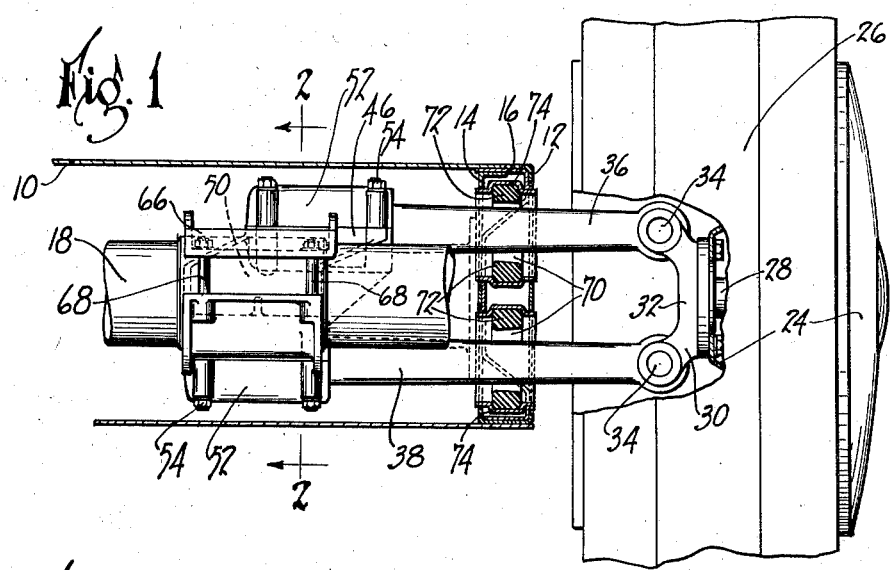
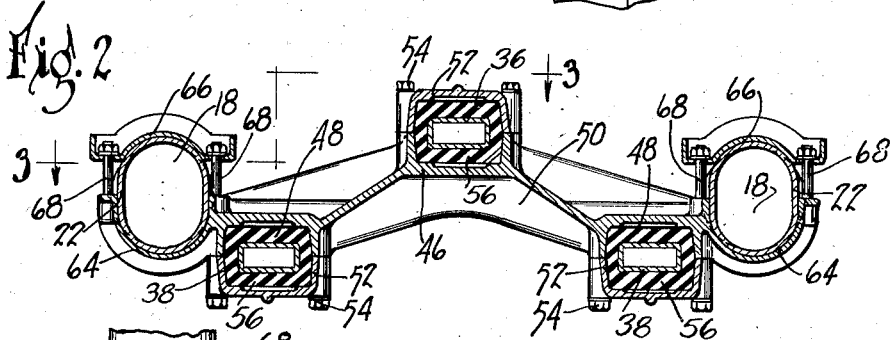
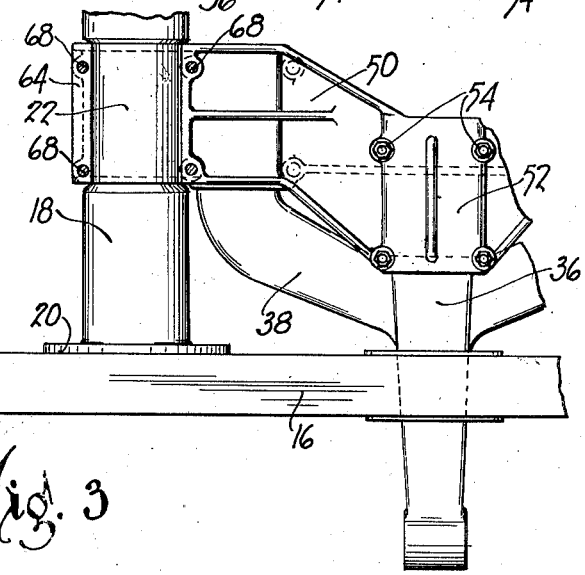
INVENTOR.
Victor W. Kliesrath
BY
ATTORNEY June 29, 1937. V. W. KLIESRATH 2,085,591
MOTOR VEHICLE
Filed July 8, 1933 2 Sheets-Sheet 2
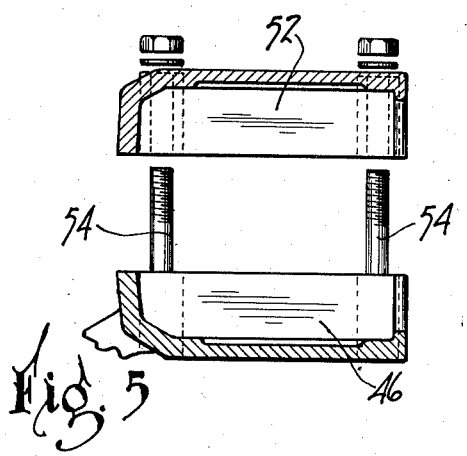
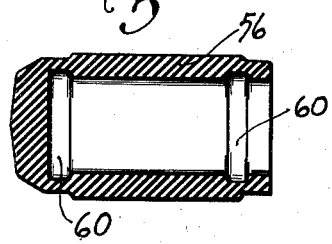
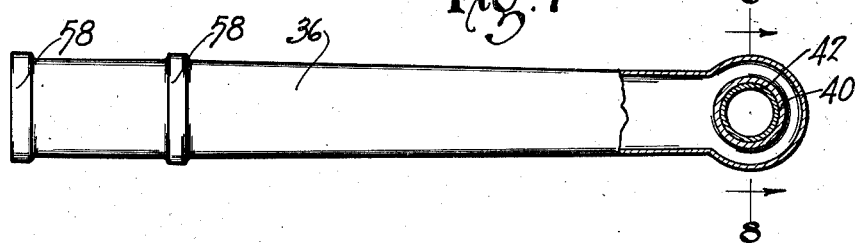
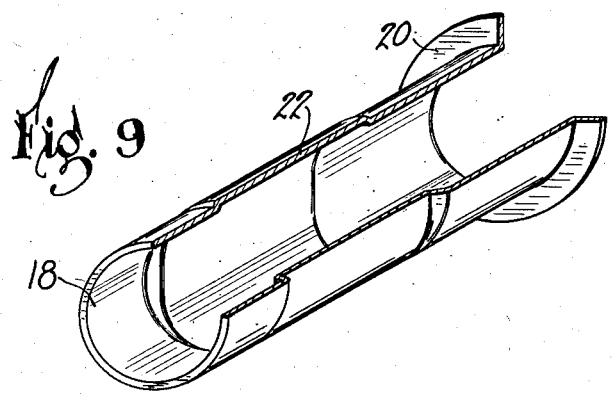
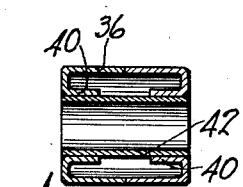
INVENTOR.
Victor W. Kliesrath
BY
ATTORNEY.

Patented June 29, 1937

2,085,591

UNITED STATES PATENT OFFICE 2,085,591

MOTOR VEHICLE

Victor W. Kliesrath, South Bend, Ind., assignor to The Steel Wheel Corporation, Chicago, Ill., a corporation of New York Application July 8, 1933, Serial No. 679,473

19 Claims. (Cl. 280—124)

This invention relates to motor vehicles and the like, and more particularly to their spring suspensions, and is illustrated as embodied in such a vehicle having individually-sprung wheels.

An object of the invention is to provide simple but strong, and inexpensive, means for yieldingly connecting a road wheel and the vehicle chassis, and forming in effect the spring suspension of the vehicle. Various features of novelty relate to the construction and arrangement of novel brackets, or the like, resiliently carrying axle sections on which the road wheel is rotatably mounted, and to the mounting of such a bracket on transverse parallel chassis-reinforcing members which are preferably of tubular form.

In the illustrated arrangement each of the brackets has at its ends seats for the transverse chassis members, and novel sockets for the axle sections are provided adjacent these seats and also approximately at the middle of the bracket.

I prefer to use a straight upper axle section having its end resiliently seated, by the use of rubber blocks or other resilient material, at its end in the central socket, and a Y-shaped lower section having the ends of its arms resiliently seated in the two end sockets. The straight section and the stem of the Y section are arranged one above the other, the sockets being correspondingly spaced vertically (i. e. crosswise of the bracket).

Another feature of the invention relates to providing a vehicle with a box-section base or the like, as a substitute for a chassis frame, within which is arranged stiffening and reinforcing means such as the above-described transverse tubular members, and with axle sections resiliently mounted on the reinforcing means and projecting outwardly through openings in the sides of said base. Preferably novel resilient bumpers, of rubber or the like, are mounted on the sides of said base, to cushion and yieldingly limit the movements of the axle sections so they will not engage the sides of the openings.

Instead of a true parallelogram linkage for the wheel, I prefer to make the lower axle section longer than the upper one, and so proportioned and arranged relatively thereto that the wheel plane is tilted somewhat as the wheel moves vertically with respect to the chassis so that the point of intersection of the wheel periphery (i. e. of the tire) and the road is not shifted toward or from the vehicle, as would be the case if the wheel swung in an arc and remained at all times parallel to itself.

The above and other objects and features of the invention, including various novel combinations of parts and desirable particular constructions, will be apparent from the following description of the illustrative embodiment shown in the accompanying drawing, in which:

Figure 1 is a transverse vertical section through one side of the vehicle chassis and the adjacent wheel;

Figure 2 is a section on the line 2—2 of Figure 1, showing the novel bracket in longitudinal section;

Figure 3 is a top plan view of the parts shown in Figure 1, but with the wheel and its support removed, and looking in the direction of the arrows 3—3 of Figure 2;

Figure 4 is a side elevation of one form of wheel support;

Figure 5 is an exploded sectional view through one of the sockets for resiliently holding the end of one of the axle sections;

Figure 6 is a section through a rubber block used for resiliently holding the end of one of the axle sections;

Figure 7 is a side elevation of one of the axle sections, broken away in vertical section at its outer end;

Figure 8 is a vertical section through the eye at the outer end of the axle section, on the line 8—8 of Figure 7; and Figure 9 is a perspective view, partly broken away, of one end of one of the tubular parallel cross members.

As more fully explained in my prior application No. 651,821, filed January 14, 1933, from which the major portion of the present application is divided, and which discloses the base or frame structure and the axle sections and their mountings as described below, the vehicle preferably has in lieu of the usual chassis frame a box-section base 10 having side walls 12 reinforced by interfitting channel members 14 and 16.

This base is reinforced and strengthened and stiffened, transversely across its rear end, by means such as a pair of parallel transverse tubular cylindrical members 18, having end flanges 20 welded or riveted or otherwise secured to the built-up side walls described above. These members are slightly flattened, to form vertically elongated or non-circular sections 22 adapted to be received in seats in novel brackets described below.

The road wheel 24, the tire of which is indicated at 26, is shown rotatably mounted on a spindle 28 of a support 30 having vertical integral webs or the like 32 formed with upper and lower pairs of eyes to be connected by means such as pivot pins 34 to the outer ends of upper and lower rigid tubular axle sections 36 and 38.

As explained in my above-mentioned prior application, and as shown in Figure 8 thereof, these sections may be made by welding or otherwise securing together face to face channel-shaped steel stampings. Preferably tubular alined bosses 40 are drawn in the stampings to be sleeved over a bushing 42 adapted to receive the pivot 34. If preferred, laminated spring axle sections may be used, as described in my application No. 677,612, filed June 26, 1933, now Patent No. 2,059,246, dated Nov. 3, 1936.

I prefer to provide in effect a three-point mounting for the wheel, by making section 36 a straight axle section and making section 38 Y-shaped in plan view, with spaced arms widely separated longitudinally of the vehicle (see Figure 3).

The end of the section 36 is shown as received in an upwardly-facing half-socket 46 integrally formed at the center, and the two arms of section 38 are shown received in downwardly-facing half-sockets 48 similarly formed adjacent the ends, of a novel bracket 50 which bridges across and supports the two cross members 18 previously described. There are of course two sets of the above described parts at opposite ends of the cross members 18, for the right and left wheels respectively.

The half-sockets 46 and 48 are completed, to hold the axle section therein, by separable half-sockets or caps 52, rigidly clamped to the bracket 50 by means such as bolts and nuts 54, heavily compressing sleeves or blocks 56 of rubber or other resilient material which are mounted on the ends of the axle sections within the above-described sockets. The axle sections may have peripheral ribs 58 (Figure 7) interlocking with internal grooves 60 formed in the sleeves 56 (Figure 6). If desired, the separate rubber blocks of my prior application No. 651,821 may be used, but I consider the above-described internally-grooved sleeves to be an improvement thereon.

The socket 46 is spaced vertically (i. e. crosswise of the bracket) above the sockets 48, so that the axle sections 36 and 38 mounted therein are arranged one above the other. It will also be apparent from Figure 1 that sections 38 are somewhat longer than sections 36.

If the upper and lower sections were the same length, vertical movements of the corresponding wheel would give what is known as a parallelogram motion. The plane of the wheel would remain at all times parallel to itself, and consequently the wheel would swing bodily in an arc. Consequently the wheel would necessarily move somewhat toward and from the center line of the vehicle (i. e. toward and from the chassis), so that the wheel would have to move sideways relatively to the road surface upon which it rests.

By making the sections 36 and 38 of different lengths as above described, and properly proportioning the parts, the wheel plane tilts slightly during vertical movements of the wheel, so that the bottom of the tire (i. e. the point of intersection between the wheel and the road surface) remains at all times in the same true vertical line, and does not move in and out relatively to the chassis as is the case with a wheel having a true parallelogram mounting. Thus relative vertical movements of the chassis and the wheel do not cause any lateral movement of the wheel with respect to the road surface, an arrangement which I consider of very substantial advantage.

The bracket 50 has at its ends upwardly-facing seats 64 embracing the non-circular portions 22 of the cross members 18 and securely clamped thereto by caps or the like 66 fastened to the bracket 50 by means such as bolts and units 68. The cap 66 is omitted in Figure 3, the better to show the mounting of the cross member 18 in the seat 64. The shape of the bracket which spaces the socket 46 nearer the side wall 16 than the sockets 48, to compensate for the shorter length of the section 36, is shown in Figure 3.

The axle sections 36 and 38 are housed at their inner ends within the box-section base 10, and pass outwardly through openings 70 (Figure 1) in the side members 12—14—16. I prefer to provide cushioning means, such as annular rubber blocks 72 in stamped housings 74 mounted in the openings 70 and encircling the axle sections 36 and 38, to serve as bumpers yieldingly limiting angular movement of the axle sections and preventing their engagement with the edges of the openings 70. The arms of section 38 do not diverge until inside the base 10, so that only one opening 70 is required for this axle section.

If desired, the non-circular portions 22 of the tubular reinforcing members 18 may be substantially longer than shown in Figure 9, and in fact may extend for the entire length of the reinforcing members. This makes it possible to change the tread (i. e. the width between the wheels) by moving the brackets 50 to different positions along the reinforcing members 18. Where the tread is definitely known in advance, as in the usual passenger car design, I prefer the arrangement shown, which positions the brackets positively exactly where they should be.

The above-described arrangement is especially adapted for the rear spring suspension of a front-drive car, and has been described in detail as so arranged. It is not my intention, however, to limit the scope of my invention to that use or by that description, or otherwise than by the terms of the appended claims.

I claim:

1. A vehicle having a pair of generally parallel strengthening and stiffening members, brackets mounted on and bridging between said members and formed with sockets, axle sections having their ends resiliently seated in said sockets, and wheels rotatably mounted at the outer ends of said sections.

2. A vehicle having a pair of generally parallel strengthening and stiffening members, brackets mounted on and bridging between said members and formed with sockets, axle sections having their ends in said sockets, wheels rotatably mounted at the outer ends of said sections, and resilient material in said sockets engaging said sections and in effect forming springs for said wheels.

3. A vehicle having a pair of parallel transverse tubular members having portions deformed to provide seats for a bracket, a bracket having its ends mounted on said seats and provided with sockets, and axle sections resiliently seated in said sockets and adapted to support the adjacent part of the vehicle on a road wheel.

4. A vehicle having a pair of parallel transverse tubular members provided with seats for a bracket, a bracket having its ends mounted on said seats and provided with sockets, axle sections in said sockets and adapted to support the adjacent part of the vehicle on a road wheel, and resilient material in the sockets engaging the axle sections and yieldingly resisting angular movement thereof.

5. A vehicle having spaced transverse members, a bracket engaging said members and carried thereby and having two end sockets and a generally-central socket at a different vertical height than the end sockets, a generally straight axle section having its end resiliently seated in the central socket, a Y-shaped axle section having its arms resiliently seated in the end sockets, the straight section and the stem of the Y-section being arranged one above the other, and means for rotatably mounting a wheel on said sections.

6. A vehicle having spaced transverse members, a bracket engaging said members and carried thereby and having two end sockets and a generally-central socket, a generally-straight axle section having its end resiliently seated in the central socket, a Y-shaped axle section having its arms resiliently seated in the end sockets, and means for rotatably mounting a wheel on said sections.

7. A bracket having at its opposite ends seats for supporting transverse chassis members and provided with caps for clamping such members on the seats, said bracket having adjacent said seats and also approximately at its center sockets for receiving the ends of axle sections and which sockets include detachable caps.

8. A bracket having at its opposite ends seats for supporting transverse chassis members, said bracket having adjacent said seats and also approximately at its center sockets all having openings facing away from the bracket for receiving the ends of axle sections, the center socket being spaced crosswise of the bracket (i. e. vertically when the bracket is in use) from the other two sockets.

9. A bracket having at each end an upwardly-facing seat and a downwardly-facing half-socket and having at its center an upwardly-facing half socket, in combination with five detachable caps cooperating with and completing the respective seats and half-sockets.

10. A vehicle having a box-section base with vertical sides having openings, reinforcing means within said base, and pairs of upper and lower axle sections resiliently mounted on said means within said base and all projecting through said openings.

11. A vehicle having a box-section base with vertical sides having openings, reinforcing means within said base, axle sections resiliently mounted on said means and projecting through said openings, and resilient bumper members carried by said sides and encircling said sections to prevent their engaging the sides of said openings and yieldingly to limit the angular movement of said sections.

12. A vehicle having a frame and an axle section having a wheel rotatably mounted on the end thereof, a socket mounted on the vehicle frame and surrounding the other end of the axle section for a substantial distance longitudinally thereof, and a resilient sleeve mounted on and interlocked with the end of said section and extending a substantial distance longitudinally thereof and seated in said socket and resisting by compression angular movements of the axle section in the socket.

13. An axle section having peripheral ribs spaced apart lengthwise of said section adjacent its end, and a resilient sleeve closed at one end and mounted on and extending across the end of said section and having internal grooves adjacent its ends interlocking with said ribs.

14. A resilient sleeve having a relatively thick closed end and adapted for mounting on and extending across the end of an axle section and which has internal grooves adjacent its opposite ends and extending entirely around the interior of the sleeve.

15. A vehicle having a box-section base completely enclosed at its top and bottom and formed with an opening in its side, a Y-shaped axle section having its diverging arms within said base and its central portion projecting outwardly through said opening, and a mounting within said base for said arms.

16. A vehicle having a pair of parallel tubular cross frame members, a bracket element extending across both members and having a socket arranged between them, a pair of parts each of which cooperates with one end of the bracket element to secure it to the corresponding cross frame member, end sockets supported by the ends of the bracket adjacent said cross frame members respectively, an axle section having its end yieldingly mounted in said first socket, and another axle section having two arms yieldingly mounted in the end sockets.

17. A vehicle having frame members, supporting means secured to said frame members and having a central socket and two end sockets, an axle section having its end yieldingly mounted in said central socket, and another axle section having two arms yieldingly mounted in the end sockets.

18. A vehicle having frame members, supporting means secured to said frame members and having a central socket and two end sockets, the central socket being at one level and the end sockets at a different level, an axle section having its end yieldingly mounted in said central socket, another axle section having arms yieldingly seated in the end sockets.

19. A motor vehicle having wheels and a chassis frame provided with upper and lower generally parallel devices mounted at their inner ends on the chassis frame and rotatably carrying a wheel at their outer ends, resilient means resisting angular movement of said devices and with said devices forming a spring suspension at said wheel independent of the spring suspensions for the other wheels, and rubber block means arranged between the chassis frame and said devices generally intermediate the ends of said devices and allowing said devices a limited range of movement unrestricted by said means and beyond said range additionally resisting angular movement of said devices.

VICTOR W. KLIESRATH.